United States Patent
Wu et al.

(10) Patent No.: US 7,990,824 B2
(45) Date of Patent: Aug. 2, 2011

(54) METHOD FOR DISTINGUISHING UNBALANCED DISC

(75) Inventors: Jin-Yi Wu, Hsinchu (TW); Jui-Cheng Lee, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 123 days.

(21) Appl. No.: 12/551,696

(22) Filed: Sep. 1, 2009

(65) Prior Publication Data

US 2010/0103552 A1  Apr. 29, 2010

(30) Foreign Application Priority Data

Oct. 24, 2008  (CN) .......................... 2008 1 0172930

(51) Int. Cl.
*G11B 7/00* (2006.01)
(52) U.S. Cl. .................. 369/53.14; 369/53.15; 369/47.1
(58) Field of Classification Search ............... 369/47.45, 369/53.14, 53.18, 53.15, 47.1
See application file for complete search history.

(56) References Cited

U.S. PATENT DOCUMENTS

| | | | |
|---|---|---|---|
| 4,727,530 A * | 2/1988 | Tomisawa | 369/47.45 |
| 7,289,405 B2 * | 10/2007 | Kim et al. | 369/53.23 |
| 2002/0118619 A1 * | 8/2002 | Tomishima | 369/53.14 |
| 2004/0013066 A1 * | 1/2004 | Oono et al. | 369/53.14 |
| 2004/0037194 A1 * | 2/2004 | Pan | 369/53.18 |
| 2005/0068872 A1 * | 3/2005 | Kim et al. | 369/53.2 |
| 2005/0081626 A1 * | 4/2005 | Lin et al. | 73/460 |
| 2006/0077813 A1 * | 4/2006 | Chuang et al. | 369/47.1 |

* cited by examiner

*Primary Examiner* — Thuy Pardo
(74) *Attorney, Agent, or Firm* — Thomas, Kayden, Horstemeyer & Risley, LLP

(57) ABSTRACT

A method for distinguishing unbalanced disc in an optical disc reproducing/recording apparatus, comprising following steps: moving an optical pickup head to a first position of an optical disc; rotating the optical disc to a predetermined rotating speed; transferring a focus error signal produced by the optical pickup head to a focus control voltage signal; controlling the optical pickup head by the focus control voltage signal to maintain a focus light spot produced by the optical pickup head on the optical disc; and distinguishing if the optical disc is an unbalanced disc according to the focus control voltage signal.

5 Claims, 4 Drawing Sheets

METHOD FOR DISTINGUISHING UNBALANCED DISC

BACKGROUND OF THE INVENTION

1. Field of the Invention

The invention relates to an optical disc recording/reproducing apparatus, and more particularly to a method for distinguishing a unbalanced disc of the optical disc recording/reproducing apparatus.

2. Description of the Prior Art

By the advancement of the manufacturing ability of the optical disc drive, the recording/reproducing speed increases continuously. High recording/reproducing speed needs the rotating motor having high rotating speed, and at this time, the quality of the optical disc will influence much to the recording/reproducing efficiency. The unbalanced disc is produced by the error during manufacturing. This makes the mass central of the unbalanced disc is not at the center of the disc. When the unbalanced disc rotates at high speed, it will vibrate and produce unpleasing vibration noises, and this may accelerate the mechanical wear of the optical disc drive. More importantly, this may induce the optical disc being scraped or abraded by the optical pickup head. Therefore, it is an important subject to well control the vibration due to the unbalanced disc.

Generally speaking, when the unbalanced degree of the optical disc is too large, the optical disc drive would lower down the rotating speed to decrease the vibration due to the unbalanced disc, which means sacrificing the reproducing speed to ensure the safety and the stability during reproducing process. However, the qualities of disc on the market are irregular, and the unbalanced degrees of defective discs also have differences. If substantially decreasing the rotating speed of the unbalanced disc to prevent vibrations, the reproducing speed of the optical disc drive will be greatly influenced, and this also reduces the marketing competitiveness of the optical disc drive. Hence, accurately distinguishing the unbalanced degree of the unbalanced disc and automatically adjusting the rotating speed of the optical disc drive according to the unbalanced degree become the key point to increase the average reproducing speed.

Commonly speaking, the unbalanced degree of the optical disc influences the reproducing speed of the optical disc drive. The recent method for distinguishing the unbalanced degree of the optical disc is affected by the orientation of the optical disc drive or the scratches on the optical disc.

U.S. Pat. No. 6,934,232B2 and 6,965,548B2 are calculating the amounts of focus error (FE) signals and the amount of track error (TE) signals respectively in a cycle for distinguishing the degree of the unbalanced disc. In US Patent Application Publication No. 2004/0013066A1, it compares the voltage value of the push-pull (PP) signal with the predetermined threshold voltage value. When the voltage value of the PP signal is larger than the threshold voltage value, the optical disc is determined to be an unbalanced disc. However, those signals mentioned above may be influenced by noises produced by the orientation of the optical disc drive, for example horizontal orientation or vertical orientation, and the scratch or other defects on the optical disc, which will affect the accuracy of the distinguished results. Therefore, the present invention provides a method for lowering the disturbances of noises and accurately distinguishing the degree of the unbalanced disc.

SUMMARY OF THE INVENTION

It is the object of the present invention to provide a method for distinguish an unbalanced disc. Especially, the method determines if an optical disc in the optical disc drive is an unbalanced disc by the focus control voltage signal which is used for controlling the focusing position of the optical pickup head inside the optical disc drive.

The present invention provides a method for distinguishing unbalanced disc in an optical disc reproducing/recording apparatus, comprising following steps: moving an optical pickup head to a first position of an optical disc; rotating the optical disc to a predetermined rotating speed; transferring a focus error signal produced by the optical pickup head to a focus control voltage signal; controlling the optical pickup head by the focus control voltage signal to maintain a focus light spot produced by the optical pickup head on the optical disc; and distinguishing if the optical disc is an unbalanced disc according to the focus control voltage signal.

BRIEF DESCRIPTION OF THE DRAWINGS

Other features and advantages of this invention will become more apparent in the following detailed description of the embodiments of this invention, with reference to the accompanying drawings, in which.

DETAILED DESCRIPTIONS OF THE PREFERRED EMBODIMENTS

Figure 1:
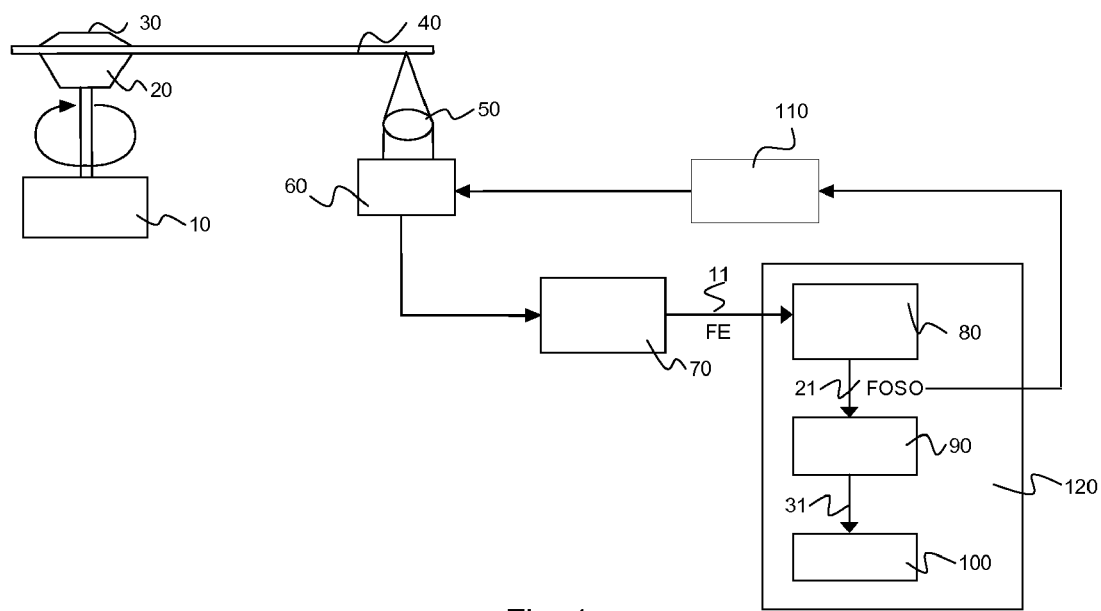
FIG. 1 shows a diagram of an optical disc drive system according to the present invention.

Please refer to FIG. 1, it shows a diagram of an optical disc drive system according to the present invention. An optical disc 40 is put on a turn table 20, and above the optical disc 40 is a clamper 30 for stably fixing the optical disc 40 on the turn table 20. The turn table 20 is driven by a spindle motor 10 and rotating at a chosen rotating speed. An optical pickup head 60 emits laser beams and laser beams focus on the optical disc 40 by passing through an objective lens 50. Then laser beams are reflected by the reflective layer of the optical disc 40, and transferred to be collimated beams by passing through the objective lens 50. Collimated beams incident to the optical pickup head 60 are received by a sensing unit inside the optical pickup head 60. The received beams are transferred to electrical signals and then computed by an amplifier 70 to produce focus error (FE) signals, track error (TE) signals and radio frequency (RF) signals. In the control circuit 120, when the focus servo system is a close loop system and the track servo system is an open loop system, the focus servo system will control the actuator of the optical pickup head 60 to lock the focusing laser spot on the recording layer of the optical disc, wherein the objective lens 50 is on the actuator. That is to say, the focusing laser spot will move up and down by the deviation of the optical disc and the focusing laser spot will always on the recording layer of the optical disc. At this time, the focus error signals 11 approach to a steady state. The voltage for controlling the actuator is a focus control voltage (so called FOSO) 21. The FOSO 21 is got according to a computation of the focus error signals 11 by a digital signal processor (DSP) 80. Then, the FOSO 21 is transmitted to a power driver 110 to control the distance between the objective lens 50 and the optical disc 40. Besides, the digital signal processor 80 contains a special equalizer (not shown), which function is enabling the servo system to be stable.

Using the FOSO 21 can overcome the error produced by the orientation of the optical disc drive when commonly using track error signals. When the optical disc drive is not on the horizontal orientation, the optical disc drive would have gravitational effects which make deviations of track error signals. This will result in the misjudgment of the control due to errors of the judged bases. Besides, in the control circuit 120, it may send FOSO 21 to pass through a low-pass filter 90 in order to lower down the noises produced by the scratch on the optical disc 40. This will increase the accuracy of judgment. Finally, transmit the filtered signal 31 to a judgment unit 100 to distinguish if the optical disc 40 is an unbalanced disc.

Figure 2:
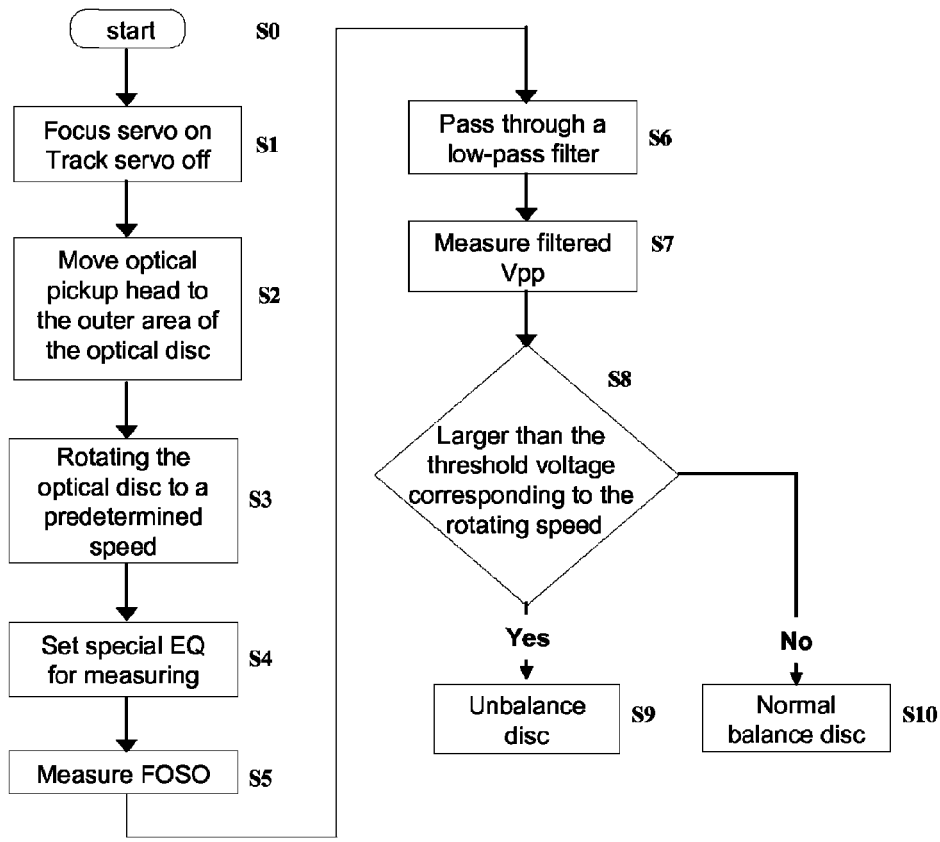
FIG. 2 shows the block diagram of the method for distinguishing unbalanced disc according the present invention.

Please refer to FIG. 2, it shows the block diagram of the method for distinguishing unbalanced disc according the present invention. The method can be applied by the firmware, and it comprises the following steps. In step S0, the optical disc 40 is put in the optical disc drive and starts to rotate. In step S1, the focus servo system is on and the track servo system is off, which make the focus servo system is in a close loop and the track servo system is in an open loop. In step S2, move the objective lens 50 to the outer area of the optical disc 40, for example 56 millimeters away from the center of the optical disc 40. In step S3, set the rotating speed of the spindle motor 10 to the predetermined rotating speed, for example 7200 revolutions per minute. In step S4, set the special equalizer in the DSP 80 before measuring the FOSO 21. In step S5, measure the FOSO 21 by the DSP 80. In step S6, send the FOSO 21 passing through a low-pass filter 90, wherein the frequency bandwidth of the low-pass filter 90 is the frequency of the predetermined rotating speed, for example 7200 revolutions per minute corresponding to the frequency bandwidth of 120 Hz. In step S7, measure peak to peak value of the filtered signal 31. In step S8, compare the measured peak to peak value with the corresponding threshold of the predetermined rotating speed by the judgment unit 100. If the peak to peak value is larger than the threshold, the optical disc 40 is determined to be an unbalanced disc (step S9). If the peak to peak value is less than the threshold, the optical disc 40 is determined to be a normal balance disc (step S10).

Figure 3A:
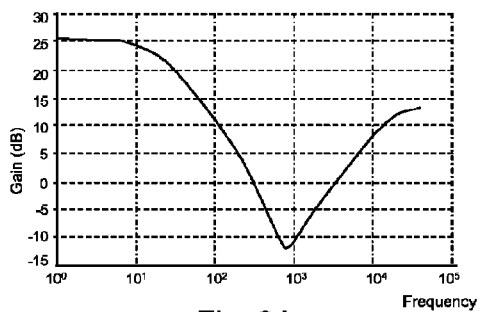
FIG. 3A shows an illustration of the gain of the equalizer of the digital signal processor varies with frequency.
Figure 3B:
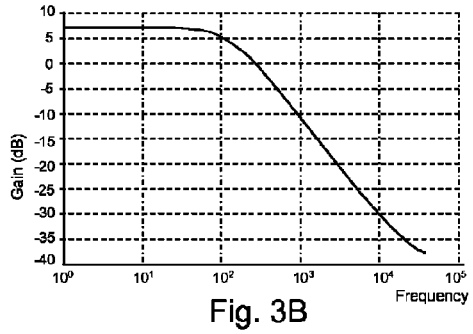
FIG. 3B shows a illustration of the gain of the low-pass filter varies with frequency.

Please refer to FIG. 3A, it shows an illustration of setting the special equalizer. In the step S4 of FIG. 2, it sets the special equalizer for measurement, and the embodiment of setting the equalizer is shown as FIG. 3A. We can set the special equalizer by the digital signal processor 80 in the control circuit 120. The special equalizer is set to have higher gain at low frequency and lower gain at high frequency. This will make the signals at the rotating frequency are more apparent than other signals after computing the focus error signals 11 through the special equalizer. The lower gain at high frequency will lessen the defect or scratch influence of the focus error signals 11. However, the gain of the special equalizer at high frequency could not to be too low. Because, low gain at high frequency might makes the servo system unstable. Therefore, under the condition of stable servo system, raising the gain at low frequency and lowering the gain at high frequency as much as possible. Please refer to FIG. 3B, it shows the illustration of the low-pass filter. In the step S6 of FIG. 2, it sends signals passing through a low-pass filter 90, wherein the embodiment of the low-pass filter 90 is shown in FIG. 3B. In control circuit 120, it can filter out high frequency signals and increase the gain of low frequency signals by setting the low-pass filter 90. This will make signals within the frequency bandwidth become more obviously. The frequency bandwidth and the rotating speed are related direct proportionally, for example the rotating speed is 7200 revolutions per minute, and then the frequency bandwidth is 120 Hz, wherein the relationship is the rotating speed divided by sixty equals to the frequency bandwidth.

Figure 4A:
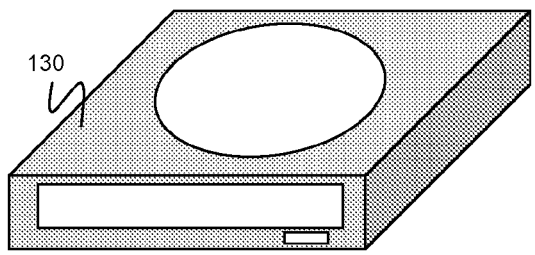
FIG. 4A shows a diagram of the optical disc drive in the horizontal orientation.
Figure 4B:
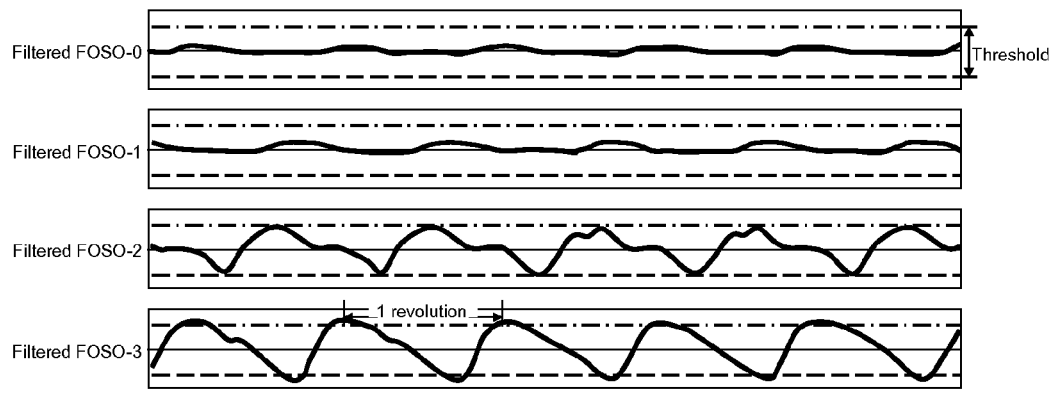
FIG. 4B shows a signal diagram of the filtered focus control voltage signal when the optical disc drive is in the horizontal orientation.
Figure 5A:
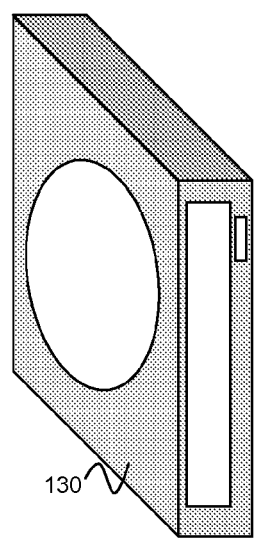
FIG. 5A shows a diagram of the optical disc drive in the left-side-up orientation.
Figure 5B:
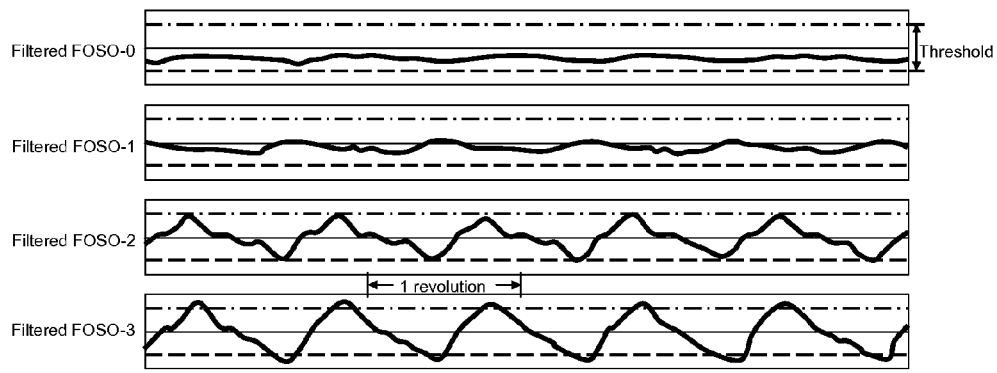
FIG. 5B shows a signal diagram of the filtered focus control voltage signal when the optical disc drive is in the left-side-up orientation.
Figure 6A:
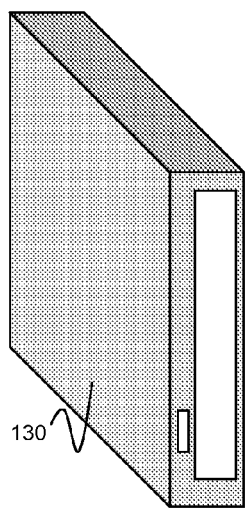
FIG. 6A shows a diagram of the optical disc drive in the right-side-up orientation.
Figure 6B:
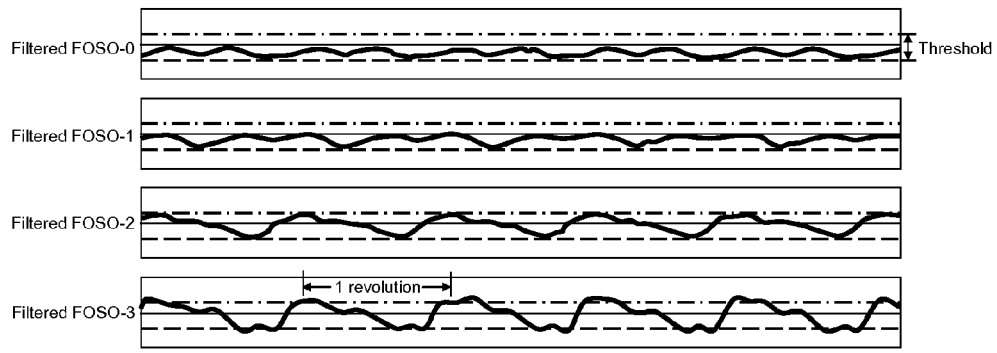
FIG. 6B shows a signal diagram of the filtered focus control voltage signal when the optical disc drive is in the right-side-up orientation.

Please refer to FIG. 4A, FIG. 5A and FIG. 6A, they show the diagram of the optical disc drive 130 in the horizontal orientation, the left-side-up orientation and the right-side-up orientation respectively. FIG. 4B, FIG. 5B and FIG. 6B show the diagram of focus control voltage signal (FOSO) 21 passing through the low-pass filter 90 when the optical disc drive 130 is in the horizontal orientation, the left-side-up orientation and the-right-side up orientation respectively. The distance between dashed lines is the predetermined threshold for each kind of orientation of the optical disc drive 130. The curved line FOSO-0 is the filtered signals by using a standard optical disc. The curved line FOSO-1 is the filtered signals by using an unbalanced disc (0.3 cm·g). From FIGS. 4B, 5B and 6B, the peak to peak value of FOSO-0 and FOSO-1 are small than the threshold, therefore the system determine that the optical disc is a normal balance disc. The curved line FOSO-2 is the filtered signals by using an unbalanced disc (0.75 cm·g). From FIGS. 4B, 5B and 6B, the peak to peak value of FOSO-2 reaches the threshold, therefore the system determine that the optical disc is an unbalanced disc. The curved line FOSO-3 is the filtered signals by using an unbalanced disc (1.0 cm·g). From FIGS. 4B, 5B and 6B, the peak to peak value of FOSO-3 is larger than the threshold, therefore the system determine that the optical disc is an unbalanced disc.

Therefore, the present invention provides a method for distinguishing unbalanced disc. By using the signal of focus control voltage signal filtered by the low-pass filter to determine if the optical disc is an unbalanced disc.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for distinguishing unbalanced disc in an optical disc reproducing/recording apparatus, comprising following steps:

moving an optical pickup head to a first position of an optical disc;

rotating the optical disc to a predetermined rotating speed;

transferring a focus error signal produced by the optical pickup head to a focus control voltage signal;

controlling the optical pickup head by the focus control voltage signal to maintain a focus light spot produced by the optical pickup head on the optical disc; and distinguishing if the optical disc is an unbalanced disc according to the focus control voltage signal, wherein the focus control voltage signal passes through a low-pass filter and the frequency bandwidth of the low-pass filter has a proportional relation to the rotating speed of the optical disc, wherein the proportional relation is the value of the rotating speed divided by the frequency bandwidth equals to sixty.

2. The method for distinguishing unbalanced disc according to claim 1, wherein the focus control voltage signal is produced from computing the focus error signal by a digital signal processor.

3. The method for distinguishing unbalanced disc according to claim 2, wherein the digital signal processor comprises an equalizer, which sets a gain at low frequency of the equalizer is large and a gain at high frequency of the equalizer is low.

4. The method for distinguishing unbalanced disc according to claim 1, wherein the first position of the optical disc is an outer area of the optical disc.

5. A method for distinguishing unbalanced disc in an optical disc reproducing/recording apparatus, comprising following steps:
  moving an optical pickup head to a first position of an optical disc;
  rotating the optical disc to a predetermined rotating speed;
  transferring a focus error signal produced by the optical pickup head to a focus control voltage signal;
  controlling the optical pickup head by the focus control voltage signal to maintain a focus light spot produced by the optical pickup head on the optical disc; and
  distinguishing if the optical disc is an unbalanced disc according to the peak to peak value of the focus control voltage signal, wherein the optical disc is an unbalanced disc when the peak to peak value of the focus control voltage signal is larger than a predetermined threshold value, and the optical disc is a normal balance disc when the peak to peak value of the focus control voltage signal is less than the predetermined threshold value.

* * * * *